United States Patent [19]

Cullen

[11] Patent Number: 5,367,860

[45] Date of Patent: Nov. 29, 1994

[54] AGRICULTURAL FEED BAGGING MACHINE HAVING AN IMPROVED AUGER CONVEYOR MOUNTED THEREON

[75] Inventor: Steven R. Cullen, Astoria, Oreg.

[73] Assignee: Versa Corporation, Astoria, Oreg.

[21] Appl. No.: 200,762

[22] Filed: Feb. 23, 1994

[51] Int. Cl.$^5$ ............... B65B 9/10; B65B 9/15; B65B 25/02

[52] U.S. Cl. .................. 53/576; 53/567; 100/100; 198/662

[58] Field of Search ............. 53/527, 529, 530, 567, 53/575, 576; 56/66; 100/100; 141/10, 98, 313, 314, 114; 198/625, 662, 663

[56] References Cited

U.S. PATENT DOCUMENTS

| | | | |
|---|---|---|---|
| 2,511,960 | 6/1950 | Andrews | 56/66 |
| 3,766,721 | 10/1973 | Linsmeier | 198/625 |
| 3,791,593 | 2/1974 | Griffin | 239/667 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/114 |
| 4,502,378 | 3/1985 | Cullen | 100/65 |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,945,715 | 8/1990 | Brodrecht | 53/567 |
| 4,949,633 | 8/1990 | Johnson et al. | 100/65 |
| 5,140,802 | 8/1992 | Inman et al. | 141/114 |
| 5,159,877 | 11/1992 | Inman et al. | 100/144 |
| 5,295,554 | 3/1994 | Cullen | 180/236 |
| 5,297,377 | 3/1994 | Cullen | 53/576 |

*Primary Examiner*—John Sipos
*Assistant Examiner*—Rodney Butler
*Attorney, Agent, or Firm*—Zarley, McKee, Thomte, Voorhees & Sease

[57] ABSTRACT

A conveyor for an agricultural feed bagging machine is disclosed and includes a double-bottom auger trough which extends upwardly and rearwardly over the upper end of the front hopper panel of the hopper on the machine. A pair of elongated augers are mounted in the double-bottom trough and have flighting thereon which are oppositely disposed with respect to each other. The augers are rotated in opposite directions so that the feed is conveyed upwardly towards the upper end of the hopper. The front auger has flighting thereon which terminates at approximately where the front auger intersects the upper end of the front panel. The back auger has flighting thereon which terminates at approximately where the back auger intersects or passes over the front wall of the hopper panel. Projections are provided on the upper ends of each of the augers above the flighting thereon.

7 Claims, 2 Drawing Sheets

AGRICULTURAL FEED BAGGING MACHINE HAVING AN IMPROVED AUGER CONVEYOR MOUNTED THEREON

BACKGROUND OF THE INVENTION

1. Field of the Invention

This invention relates to an agricultural feed bagging machine and more particularly to an agricultural feed bagging machine having an improved auger conveyor associated therewith for conveying feed from a feed wagon or the like upwardly towards the hopper of the bagging machine with the result being that the feed is evenly distributed across the length of the rotor.

2. Background Information

Agricultural feed bagging machines have been employed for several years to bag or pack silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag.

In the prior art machines, the silage material (feedstuffs) is conveyed upwardly from a feed wagon or the like into a hopper which is in communication with a rotor. In the prior art machines, the feedstuffs were conveyed upwardly to the hopper by means of either a belt conveyor or a chain conveyor. Although the prior art belt conveyors and chain conveyors did convey the feed upwardly to the hopper, it was extremely difficult to deliver the feed evenly across the rotor. The belt conveyor normally conveys the feed upwardly and delivers the feed to a series of adjustable paddles, usually two or three, which divert the feed to two to three locations on the rotor. In dry to wet feed or different kinds of feed, the paddles require frequent adjustment. Also, in dry feedlots, airborne particles are created due to the high speed diverting process.

With the use of chain conveyors, attempts of evenly distributing the feed across the rotor was accomplished by two complete chain and slat conveyors attached side by side with one being shorter than the other to enable feed to fall off on two locations of the packing rotor. Another prior art approach was to provide a diverter board on a single chain and slat conveyor to simply shove off the feed partly as it is being conveyed upwardly. The double chain conveyor and the diverting board conveyor, have high chain wear and adjustments are frequently necessary. Perhaps the most critical problem associated with the belt and chain conveyors is the loss of the effect of their diverting methods when the conveyor is filled on one side or the other from the farm wagon. In operation, the bagging machine moves constantly ahead when filling, requiring the farm wagon to be pulled ahead accordingly, thus, almost never filling the conveyor in the center at all times.

SUMMARY OF THE INVENTION

A conveyor mechanism is provided for an agricultural feed bagging machine which is designed to convey feed upwardly to the bagging machine hopper in such a manner so that the feed is evenly distributed across the length of the rotor. A double-bottom auger trough extends upwardly and rearwardly towards the upper end of the hopper from a location at the right front portion of the bagging machine. An elongated front auger is positioned in the forwardmost trough portion while a rear auger is positioned in the rearwardmost trough portion. The helical flighting on the front and rear augers is oppositely disposed with the front and rear augers being rotated in opposite directions.

The double-bottom auger trough is sliced or cut diagonally from the inside corner to the outside corner under the augers. The rear auger which is closest to the packing rotor has flighting thereon for approximately one-half of its length and has a plurality of spaced-apart projections extending therefrom from the upper end of the rear auger. The front auger has helical flighting thereon for substantially its entire length except for a portion at its upper which has projections extending therefrom. The design of the conveyor ensures that the feed will be evenly distributed across the length of the rotor.

It is therefore a principal object of the invention to provide an improved bagging machine.

Yet another object of the invention is to provide an improved conveyor for a bagging machine.

Still another object of the invention is to provide an improved conveyor for a bagging machine which insures that the feed will be evenly distributed across the length of the rotor.

Still another object of the invention is to provide an improved conveyor for an agricultural bagging machine which is substantially maintenance-free and which requires no adjustment since it handles feeds of all types and moisture content.

These and other objects will be apparent to those skilled in the art.

DESCRIPTION OF THE PREFERRED EMBODIMENT

Figure 1:
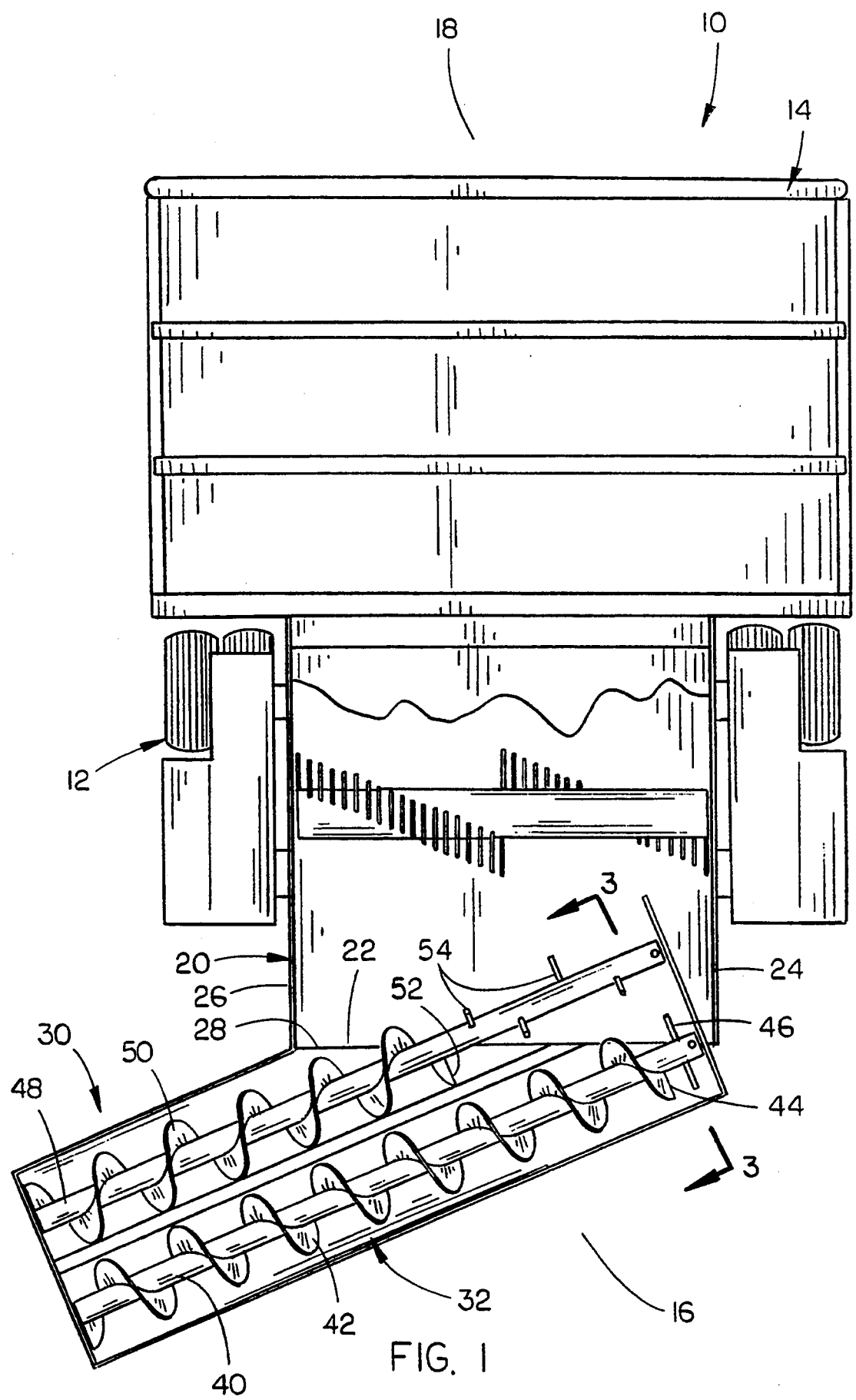
FIG. 1 is a top view of a bagging machine having the improved conveyor of this invention mounted thereon.

The numeral 10 refers to an agricultural feed bagging machine which is substantially conventional in design except for the improved conveyor which is positioned at the forward end of the machine as will be described hereinafter.

Machine 10 includes a wheeled frame means 12 having a tunnel 14 mounted thereon upon which is normally positioned the open mouth of a conventional agricultural bag (not shown). Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO. The conveyor means of this invention could be powered by the engine or the PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. Hopper means 20 includes a front hopper panel 22 and opposite sides 24 and 26. For purposes of description, the front hopper panel 22 will be described as having a top or upper end 28.

Figure 2:
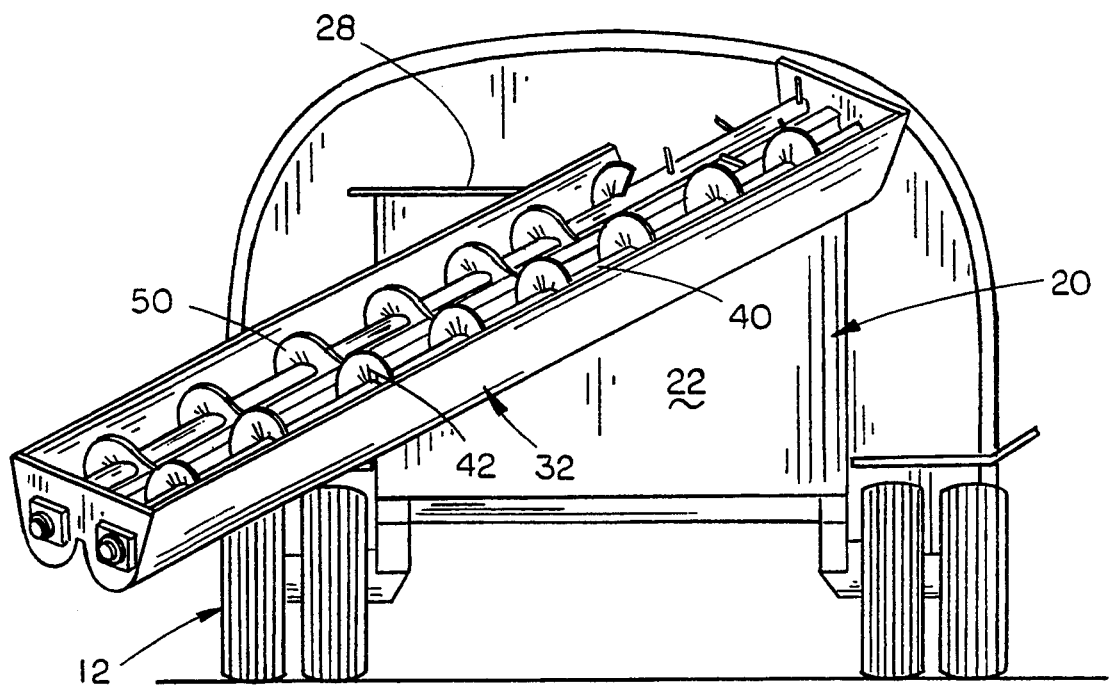
FIG. 2 is a front view of the bagging machine of FIG. 1.
Figure 3:
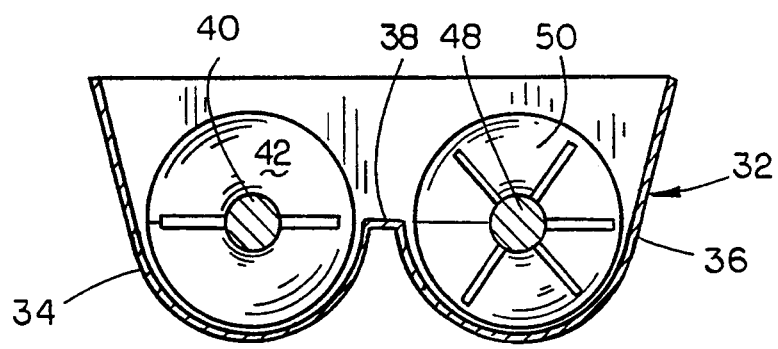
FIG. 3 is an enlarged sectional view seen on lines 3—3 of FIG. 1.

The improved conveyor of this invention is referred to generally by the reference numeral 30 and is positioned at the forward end of the machine as illustrated in the drawings. Conveyor 30 includes an auger trough assembly 32 which is of the double bottom type best illustrated in FIG. 3 and which includes a front or first trough portion 34 and a back or second trough portion 36. Trough portions 34 and 36 have a shear bar 38 mounted therebetween. As seen in FIG. 2, the auger trough assembly 30 extends upwardly and rearwardly to the upper end of the hopper. The rearward end of auger trough assembly 32 is cut at an angle as best illustrated in FIG. 1 at the point where the auger trough assembly 32 intersects or passes over the top or upper end 28 of panel 22.

An elongated auger 40 is mounted in trough portion 34 and has helical flighting 42 thereon. The upper end of the helical flighting 42 terminates at 44 which is approximately where the auger 40 intersects or passes over the upper end 28 of panel 22. Auger 40 is provided with a plurality of projections 46 extending therefrom at a location above the upper end 44 of the flighting 42 as best illustrated in FIG. 1.

An elongated auger 48 is positioned in trough portion 36 and has helical flighting 50 thereon for approximately one-half of its length. The flighting 50 is oppositely disposed with respect to the flighting 42 and the power means which is associated with the augers 40 and 48 rotates the augers in opposite directions. The upper end of the flighting 50 terminates at 52 which is approximately where the auger 48 intersects or passes over the upper end 28 of panel 22. A plurality of spaced-apart projections 54 extend from the auger 48 above the upper end 52 of the flighting 50.

The improved conveyor of this invention represents a significant advance in the art in that substantially eliminates the problems associated with the prior art conveyors. The oppositely rotating augers 40 and 48 convey the material upwardly on the conveyor to the upper end of the hopper. Due to the construction of the augers, it doesn't matter if the conveyor is filled on one auger, in the middle, or on the other auger from the wagon since the feed is moved to the center of the trough assembly due to the rotation of the auger as it is being conveyed upwardly on the conveyor. Such construction solves the problem of the positioning of the feed on the conveyor.

As stated, the auger trough assembly 30 is cut or sliced at a diagonal from the inside corner to the outside corner under the augers as best illustrated in FIG. 1. The fact that the flighting 42 on auger 40 and the flighting 50 on the auger 48 terminate at the point of intersection of the augers with the upper end of the panel 22 ensures that the feed will be evenly discharged from the conveyor regardless of the type of feed, moisture content or length of feed particles. The augers of this invention require no adjustment of any kind and maintenance is very minimal. The design of the flighting, projections and auger trough is such that the feed is evenly distributed across the length of the rotor.

Thus it can be seen that the invention accomplishes at least all of its stated objectives.

I claim:

1. An agricultural bagging machine for bagging agricultural material into agricultural bags having a closed end and an open mouth comprising, a frame means having rearward and forward ends;
a tunnel on said frame means and having an intake end for receiving the material to be bagged and an output end adapted to receive the open mouth of the agricultural bag;
a hopper on said frame means forwardly of said tunnel for receiving the material to be bagged;
said hopper having an open upper end;
a horizontally disposed rotor rotatably mounted on said frame means at the intake end of said tunnel for forcing the material to be bagged from said hopper into said tunnel and into said bag;
said hopper being defined by an upstanding front hopper panel, an upstanding rear face panel, and upstanding side walls;
and a material conveyor means mounted at the forward end of said frame means and including a portion extending upwardly over said hopper;
said material conveyor means comprising an auger trough assembly having upper and lower ends, said auger trough assembly extending upwardly and rearwardly from its lower end to its upper end, said auger trough having first and second elongated augers mounted therein;
said auger trough assembly including a first trough portion associated with said first auger and a second trough portion associated with said second auger, said first and second trough portions each having upper and lower ends;
said first auger being positioned forwardly of said second auger;
the upper end of said first auger being positioned over the upper end of said front hopper panel adjacent one side of said hopper;
the upper end of said second auger being positioned above and rearwardly of the upper end of said first hopper panel so that a portion of the length of said second auger is positioned above said hopper;
said first and second augers having helical flighting thereon whereby rotation of said first and second augers will cause material thereon to be conveyed upwardly towards said upper end of said hopper, said helical flighting on said first and second augers each having upper and lower ends;
said upper end of said helical flighting on said second auger being positioned approximately at the location where said second auger intersects the upper end of said front hopper panel;
said upper end of said first trough portion being positioned approximately at the location where said first trough portion intersects the upper end of said front hopper panel;
said upper end of said second trough portion being positioned approximately at the location where said second trough portion intersects the upper end said front hopper panel;
said second auger having a plurality of spaced apart projections extending therefrom above the upper end of said helical flighting thereon.

2. The machine of claim 1 wherein said upper end of said helical flighting on said first auger is positioned approximately at the location where said first auger intersects the upper end said front hopper panel and wherein a plurality of spaced apart projections extend from said first auger above the upper end of said helical flighting on said first auger.

3. The machine of claim 1 wherein said auger trough assembly includes an elongated shear bar positioned between said first and second auger trough portions.

4. The machine of claim 1 wherein said helical flighting on said first auger is oppositely disposed to the flighting of said second auger and wherein said first and second augers are rotated in directions opposite to one another.

5. The machine of claim 1 wherein said auger trough assembly comprises a double bottom trough.

6. The machine of claim 1 wherein said projections on said second auger extend at a right angle therefrom.

7. The machine of claim 2 wherein said projections on said first and second auger extend at a right angle therefrom.

* * * * *